United States Patent
Mabry et al.

(10) Patent No.: US 10,060,162 B2
(45) Date of Patent: Aug. 28, 2018

(54) CLOSED-LOOP HANDLEBAR LOCKING DEVICE FOR A BICYCLE

(71) Applicants: John D. Mabry, Seattle, WA (US); Taylor Sizemore, Seattle, WA (US); Clement Gallois, Seattle, WA (US); Oliver Mueller, San Francisco, CA (US); Kay Kim, Mukilteo, WA (US); Michael Charles, Mercer Island, WA (US)

(72) Inventors: John D. Mabry, Seattle, WA (US); Taylor Sizemore, Seattle, WA (US); Clement Gallois, Seattle, WA (US); Oliver Mueller, San Francisco, CA (US); Kay Kim, Mukilteo, WA (US); Michael Charles, Mercer Island, WA (US)

(73) Assignee: TEAGUE ASSOCIATES INCORPORATED, Seattle, WA (US)

( * ) Notice: Subject to any disclaimer, the term of this patent is extended or adjusted under 35 U.S.C. 154(b) by 0 days.

(21) Appl. No.: 14/708,840

(22) Filed: May 11, 2015

(65) Prior Publication Data
US 2016/0333611 A1    Nov. 17, 2016

(51) Int. Cl.
*B62K 21/16*    (2006.01)
*B62H 5/04*    (2006.01)
(Continued)

(52) U.S. Cl.
CPC .............. *E05B 71/00* (2013.01); *B62H 5/04* (2013.01); *B62K 21/16* (2013.01); *B62H 2005/008* (2013.01)

(58) Field of Classification Search
CPC ......... E05B 71/00; B62K 21/14; B62K 21/16; B62H 3/02; B62H 5/02; B62H 5/04; B62H 2500/008; B62H 2005/008
See application file for complete search history.

(56) References Cited

U.S. PATENT DOCUMENTS

| 594,991 | A | * | 12/1897 | Gilbert | B62K 21/16 74/551.3 |
|---|---|---|---|---|---|
| 3,530,738 | A | * | 9/1970 | Kerr | B62K 21/16 74/551.3 |

(Continued)

FOREIGN PATENT DOCUMENTS

| BE | 1009893 A6 * | 10/1997 | ............. B62K 21/16 |
| FR | 2899867 A1 * | 10/2007 | ............. B62K 21/08 |
| NL | 9201686 A * | 4/1994 | ............... B62H 5/14 |

OTHER PUBLICATIONS

Jaryn Miller, Senza Bike Lock System, (Published Apr. 8, 2011), https://www.behance.net/gallery/1232073/Senza-Bike-Lock-System.*

(Continued)

*Primary Examiner* — Adam D Rogers
(74) *Attorney, Agent, or Firm* — Foster Pepper PLLC

(57) ABSTRACT

A closed loop handlebar locking device is securely coupled to a bike allowing safe and accurate steering of the bike. Device is further suitable for locking the bike when not in use. Device is configurable to lock a bike to a fixed object, such as a signpost while still attached to the stem of the bike. The device is also configurable to lock the bike when a suitable object is not available. In such a situation the device may be removed from the stem, passed around the frame and through one or both wheels. The device is attached to the stem via a stem piece that remains attached to the stem when the device is detached. Brakes, lights, computer and other accessories and components are attached to the stem piece. The bike is unsuitable for operation if the handlebar locking device is defeated by a would-be thief.

15 Claims, 10 Drawing Sheets

(51) Int. Cl.
  *E05B 71/00* (2006.01)
  *B62H 5/00* (2006.01)

(56) References Cited

U.S. PATENT DOCUMENTS

| | | | | |
|---|---|---|---|---|
| 5,133,568 A * | 7/1992 | Balterman | ............... | B62H 5/14 |
| | | | | 224/420 |
| 5,138,901 A * | 8/1992 | Dabandjian | .......... | B62K 21/125 |
| | | | | 224/420 |
| 5,163,339 A * | 11/1992 | Giard, Jr. | ............. | B62K 21/125 |
| | | | | 403/374.4 |
| 5,226,341 A * | 7/1993 | Shores | ..................... | B62H 5/00 |
| | | | | 224/420 |
| 5,353,663 A * | 10/1994 | Samuelson | .............. | B62H 5/00 |
| | | | | 280/288.4 |
| 5,395,018 A * | 3/1995 | Studdiford | ............... | B62H 5/00 |
| | | | | 224/420 |
| 5,701,771 A * | 12/1997 | Bailey | ................... | B60R 25/022 |
| | | | | 70/163 |
| 5,992,192 A * | 11/1999 | Tual | ......................... | B62H 5/00 |
| | | | | 224/420 |
| 6,748,821 B1 * | 6/2004 | Smith | .................. | B62K 21/125 |
| | | | | 74/551.1 |
| 7,132,931 B2 * | 11/2006 | Okada | ..................... | B62J 99/00 |
| | | | | 340/425.5 |

OTHER PUBLICATIONS http://www.theverge.com/2016/5/25/11759840/vanmoof-electrified-s-smart-bike-test-ride-price-preview.
https://biomega.com/product/bos-8-speed/.
https://www.indiegogo.com/projects/yerka-the-unstealable-bike#/.
https://havefunbiking.com/interlock-hidden-bike-lock-seatpost/.
https://www.behance.net/gallery/1232073/Senza-Bike-Lock-System.

* cited by examiner

CLOSED-LOOP HANDLEBAR LOCKING DEVICE FOR A BICYCLE

FIELD OF THE INVENTION

The present application primarily relates generally to bicycle security devices and more particularly to bicycle locks.

BACKGROUND OF THE INVENTION

Bicycle security is a concern of bike owners. Unattended and unlocked bikes are often stolen. Bike locks come in a variety of styles, shapes and sizes, including cables, chains and bar locks. Cables and chains offer convenience because they are flexible and may go around the bike and other objects, such as a stationary pole, to which the bike is to be locked. However chains and cables are relatively easily defeated with a saw or bolt cutter. Bar locks, also known as U-locks, because of their shape, are generally considered the most secure type of bike lock. However, U-locks are not always convenient to carry because of their rigid construction. Also, all of these locks must be carried while riding the bike (either on the bike or on the rider's person), which adds both weight and inconvenience.

Removal of components, such as the seat or a wheel from a locked bike is a further deterrent to would-be thieves, but it may be inconvenient for the bike owner to carry these components while they are away from the bike.

Accordingly, there is a need for a more convenient and secure bicycle lock.

SUMMARY OF THE INVENTION

The present invention is generally directed towards a closed loop, handlebar locking device for a bicycle. According to one aspect of the present invention, the closed loop, handlebar locking device is securely coupled to the stem of a bike and allows safe and accurate steering and operation of the bike. According to another aspect of the present invention, the closed loop, handlebar locking device is configurable to lock the bike to an object, such as a signpost, while still attached to the stem of the bike. According to yet another aspect of the present invention, the closed loop, handlebar locking device is configurable to lock the bike when a suitable stationary object, such as a signpost, is not available. The handlebar locking device is detached from the stem and passed through one or both wheels.

According to a further aspect of the present invention, the closed loop, handlebar locking device is attached to the stem of the bicycle via a stem piece that remains attached to the stem when the handlebar locking device is detached and renders the bike unfit for operation.

BRIEF DESCRIPTION OF THE DRAWINGS

Preferred and alternative examples of the present invention are described in detail below with reference to the following drawings.

DETAILED DESCRIPTION OF THE PREFERRED EMBODIMENT

This patent application is intended to describe one or more embodiments of the present invention. It is to be understood that the use of absolute terms, such as "must," "will," and the like, as well as specific quantities, is to be construed as being applicable to one or more of such embodiments, but not necessarily to all such embodiments. As such, embodiments of the invention may omit, or include a modification of, one or more features or functionalities described in the context of such absolute terms. The terms "bike" and "bicycle" are used interchangeably in this application and are intended to have the identical meaning.

Bike locks in use today come in a variety of styles, shapes and sizes. They may be a separate accessory for a bike, and consist of a chain, cable, bar or combinations thereof, along with any one of a variety of key or combination locks. These are generally carried on the bike or by the rider and then attached to the bike when it needs to be secured. Other types of bike locks may be integrated into the bike by feeding a cable or chain into a specially designed bike frame. The bike frame itself may even become the locking device. A locking system may also form a part of, or be integrated into a bike accessory, such as a seat or handlebar.

All of the foregoing examples lack certain advantages addressed by one or more embodiments of the present invention. Some of the foregoing systems use cables or chains, which may be defeated with a saw or set of bolt cutters. Some of the systems that are integrated into the bike frame add weight to the bike. Some of the systems are limited as to where they may be used on the bike, for example when the cable is attached to the seat post or when the locking handlebar must be removed from the handlebar stem in order to use it as a lock. Still others may actually compromise the integrity of the bike itself (for example, where the bike frame is also part of the locking system. Also, some of the foregoing systems, if defeated, allow the bike to be operated by the thief.

Figure 1:
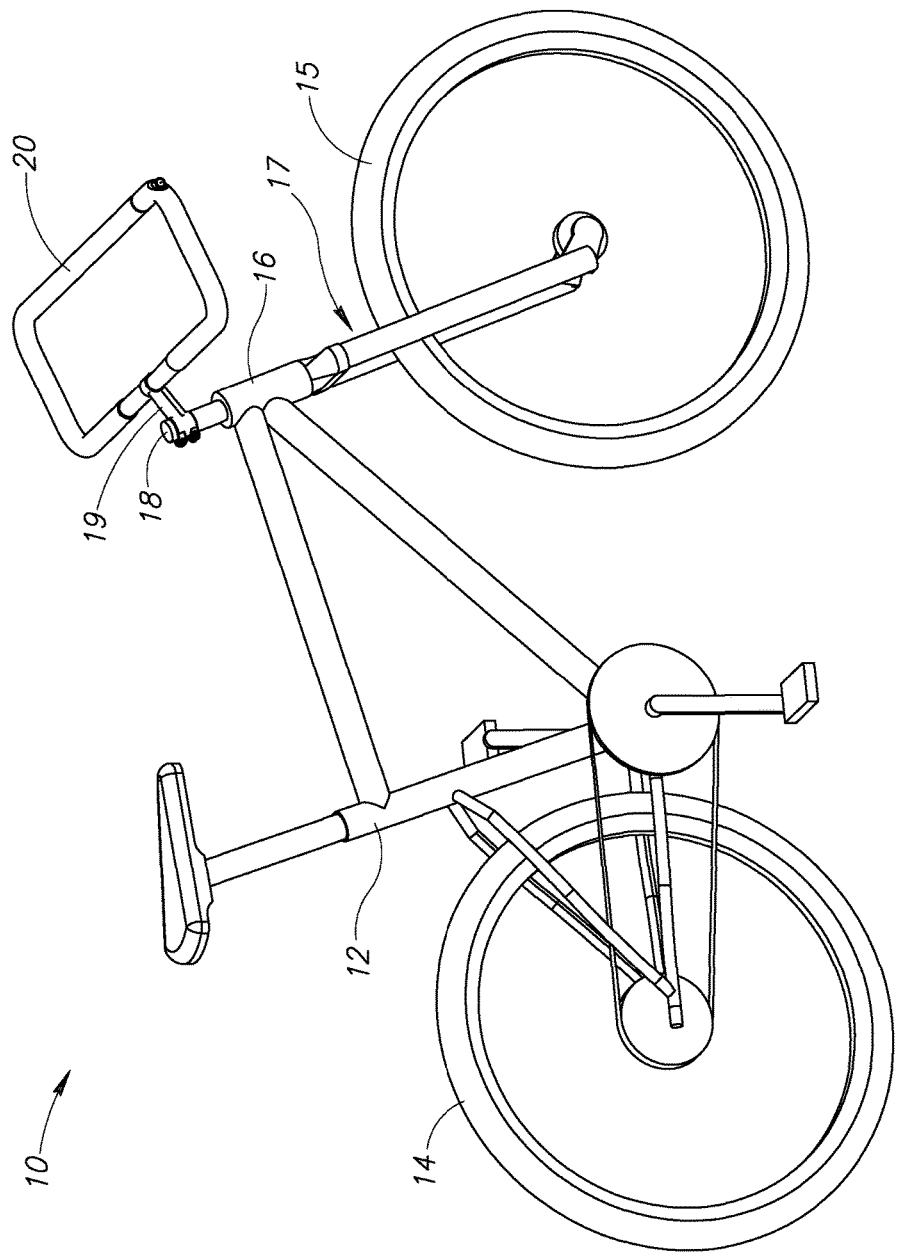
FIG. 1 illustrates a bicycle incorporating a closed loop, handlebar locking device mounted on the bicycle in a handlebar configuration according to a preferred embodiment of the present invention.

Turning now to FIG. 1, there is depicted a preferred embodiment of the present invention. A bicycle, or bike, 10 is shown with frame 12, rear and front wheels, 14, 15, head tube 16, steer tube 18, stem 19 and handlebar locking device 20. In a preferably conventional manner, head tube 16 forms a portion of frame 12, and steer tube 18 passes through head tube 16 and forms part of forks 17, which are connected to front wheel 15. Handlebar locking device 20 is securely coupled to stem 19 to allow steering and operation of the bike 10. As will be discussed more fully below, handlebar lock 20 is a closed-loop handlebar locking device suitable for steering and operating the bike 10 while the bike 10 is in use and also for securely locking the bike 10 when the bike 10 is not in use. As shown in FIG. 1, handlebar locking device 20 is attached to the bike 10 for steering and operation by a rider (not shown).

Figure 2:
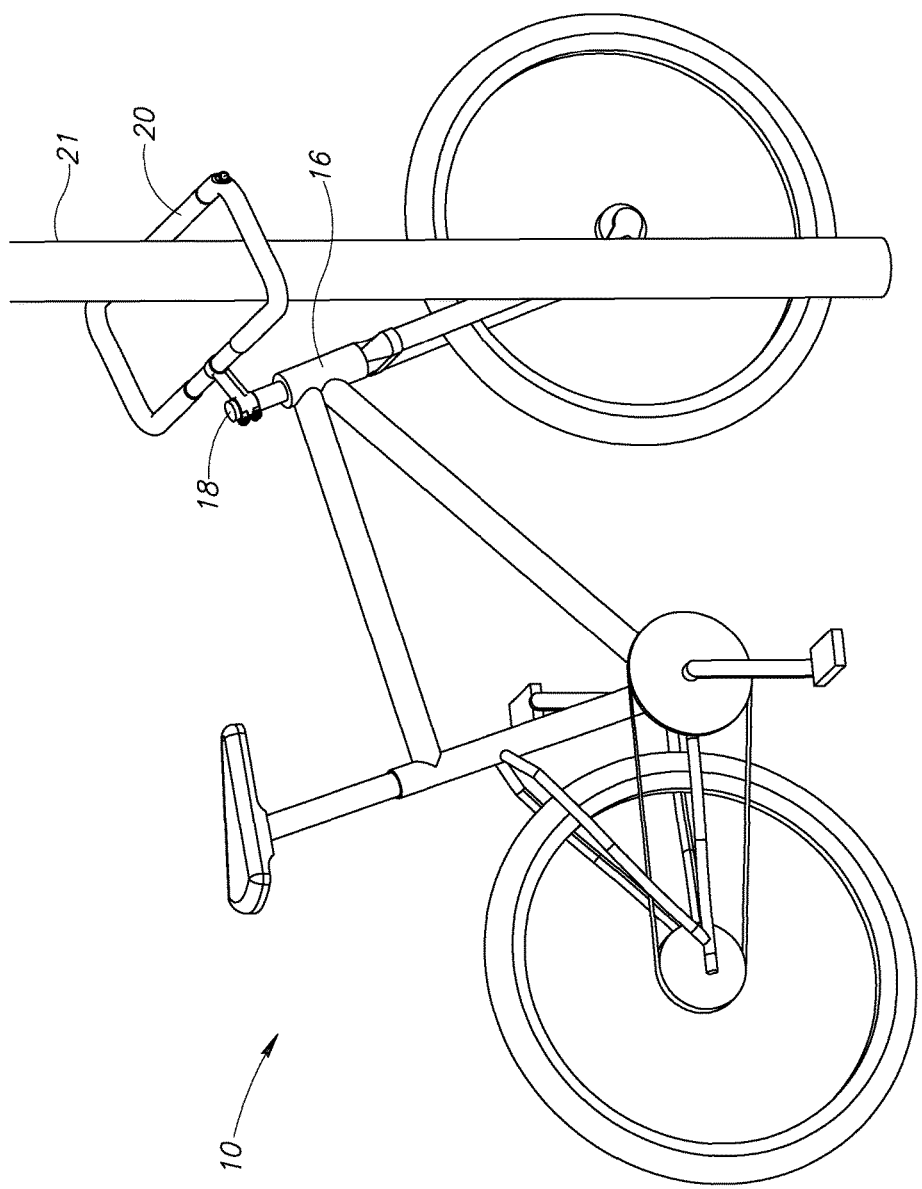
FIG. 2 illustrates the bicycle of FIG. 1 wherein the locking device is mounted on the bicycle in a locked, closed loop configuration.

FIG. 2 illustrates bike 10 when not in operation and securely attached to post 21, which may be a sign post, street light pole, or other structure suitable for securing the bike. As illustrated in FIG. 2, bike 10 is secured to post 21 by the closed loop, handlebar locking device 20, which is still attached to stem 19 and bike 10. In this way, the handlebar locking device 20 is attached to the bike 10 in substantially the same configuration as when the bike 10 is being operated by a rider.

Figure 3:
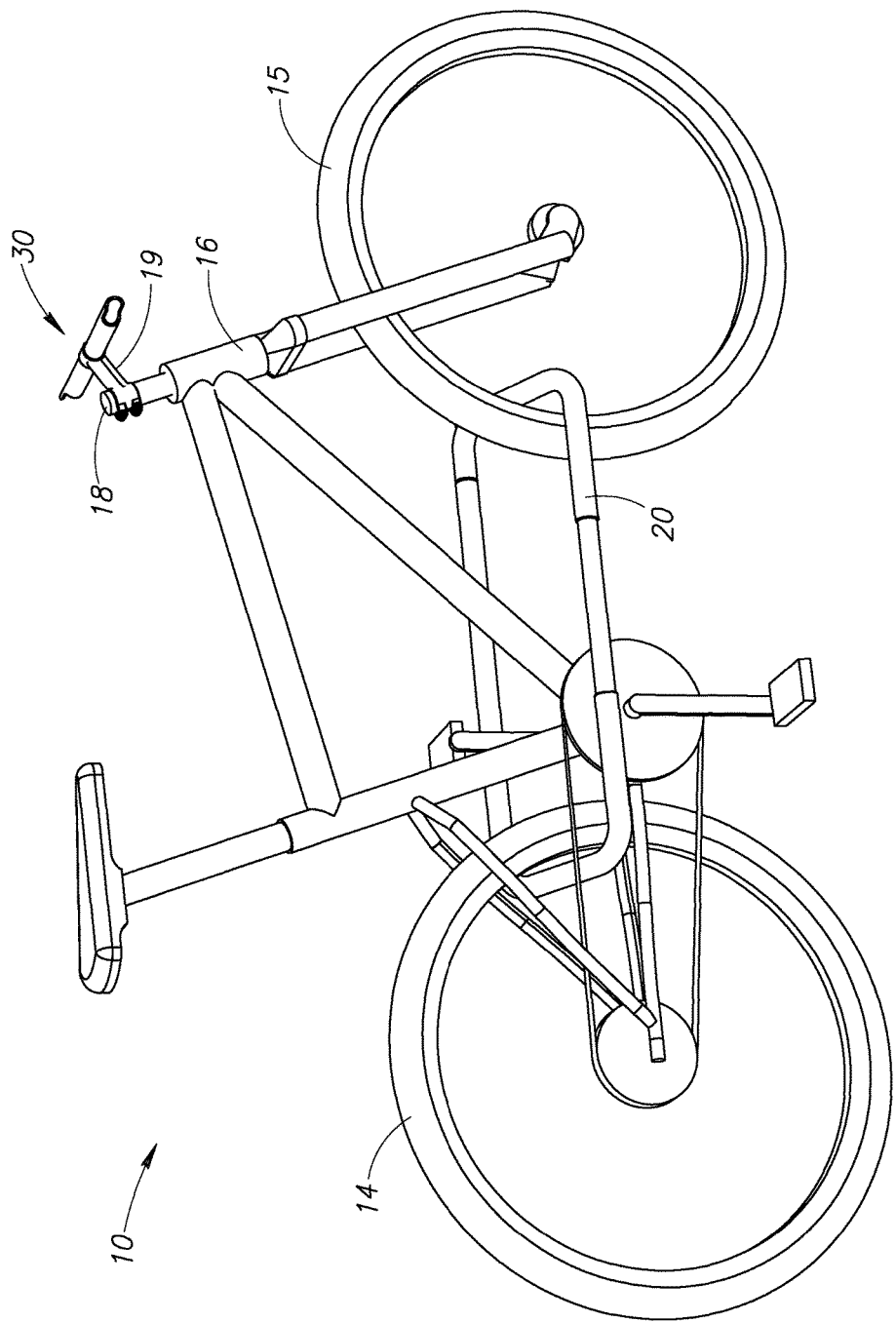
FIG. 3 illustrates the bicycle of FIG. 1 wherein the locking device is in a locked, closed loop configuration and is disconnected from the bicycle.

FIG. 3 illustrates bike 10 when not in operation and locked with closed loop, handlebar locking device 20. The configuration depicted in FIG. 3, illustrates a situation in which, for example, a pole or other fixed structure is not available for locking bike 10. In this situation, handlebar locking device 20 is removed from stem 19 and passed around frame 12 and through both rear and front wheels 14, 15. As will be described more fully below, mounting piece 30 preferably remains attached to stem 19.

Figure 4:
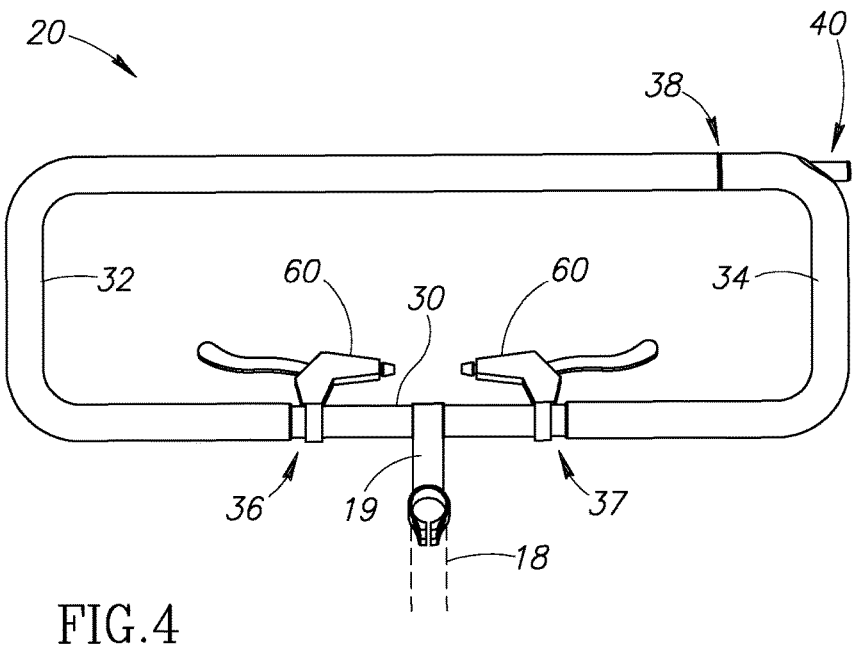
FIG. 4 illustrates a preferred embodiment of the present invention in a locked configuration.
Figure 5:
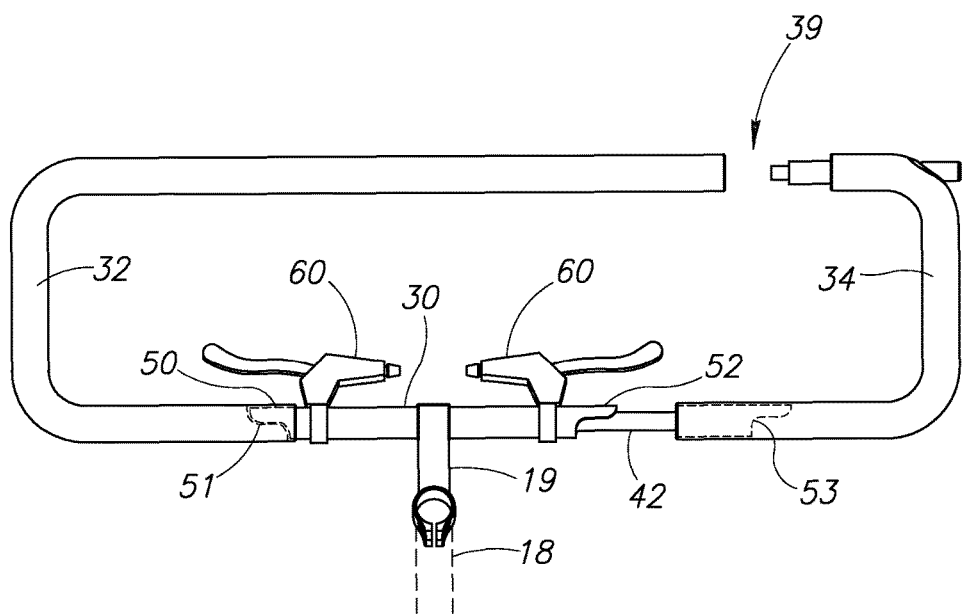
FIG. 5 illustrates a preferred embodiment of the present invention in an unlocked configuration.

FIGS. 4 and 5 illustrate the handlebar locking device 20 according to a preferred embodiment configured as a closed loop (FIG. 4) that may be opened (FIG. 5). By opening the handlebar locking device 20, it may be placed around a post (see FIG. 2) or components of the bike (see FIG. 3). The handlebar locking device 20 is shown in FIG. 5 in an open state, although not necessarily a fully opened state, such that opening 39 may be narrower or wider than depicted.

As further illustrated in FIGS. 4 and 5, the handlebar locking device 20 preferably comprises handlebar members 32 and 34 and stem piece 30. When device 20 is mounted to bike 10, the stem piece 30 is attached to the stem 19 of bike 10, and each handlebar member 32, 34 attach at opposite ends of stem piece 30 at points 36, 37. The other ends of members 32, 34 attach to one another at point 38. In this configuration, members 32, 34 and stem piece 30 form a closed loop. Locking mechanism 40 is preferably coupled to member 34 and is configured to lock together members 32, 34 when device 20 is closed (FIG. 4). When locking mechanism 40 is unlocked, device 20 is opened by pulling members 32, 34 apart to create opening 39 at point 38. Locking mechanism 40 may be operated by, for example, key, number combination or remote control.

By opening handlebar locking device 20, as described above and illustrated in FIG. 5, the bike may be secured to an object, such as post 21 by placing the handlebar locking device around the post 21 and closing and locking the handlebar locking device 20 with lock mechanism 40 (see FIG. 2).

Figure 6:
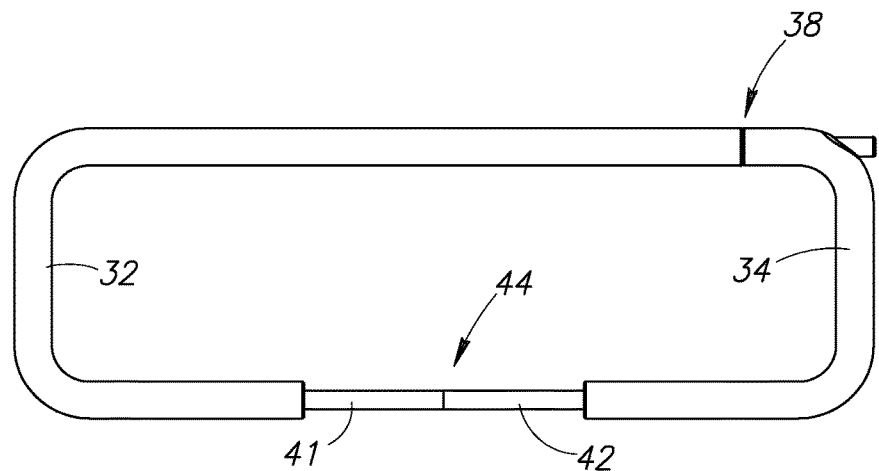
FIG. 6 illustrates aspects of the embodiment depicted in FIGS. 4 and 5.

As mentioned previously, handlebar locking device 20 may also be removed from the stem 19 for locking the bike 10 as shown in FIG. 3. Turning to FIG. 6, handlebar locking device 20 is shown removed from stem 19 of the bike 10. In this configuration, the stem piece 30 remains attached to stem 19 (see FIG. 7). As shown in FIG. 6, the handlebar locking device 20 is configurable to form a closed loop without stem piece 30. In this configuration, handlebar members 32, 34 have ends joined at point 38. Members 32, 34 are preferable hollow and include within, inner members 41 and 42 respectively. In the closed position, inner members are in contact at point 44 to form a closed loop. As will be discussed more fully below, inner members 41, 42 are positioned inside, and preferably secured in, stem piece 30 when device 20 is mounted on bike 10.

Figure 7:
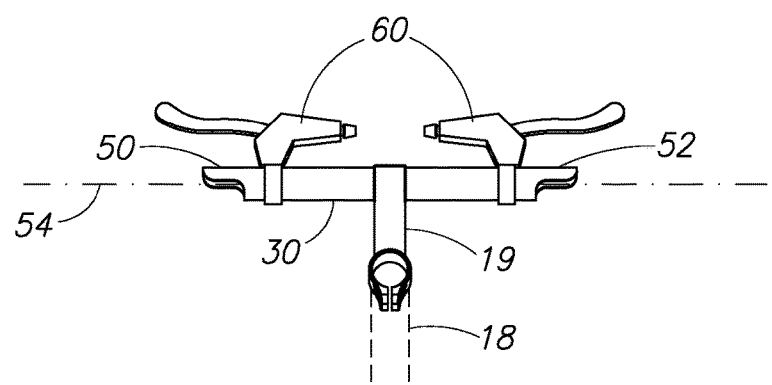
FIG. 7 illustrates further aspects of the embodiment depicted in FIGS. 4 and 5.

As further shown in FIGS. 5 and 7, stem piece 30 includes locking lugs 50, 52 on each end. When handlebar locking device 20 is coupled to stem piece 30, and in the locked position (see FIG. 4) inner members 41, 42 slide inside stem piece 30. Locking lugs 50, 52 are brought into contact with mating receivers 51, 53 (FIG. 5) inside handlebar member 32, 34 and prevent rotation of device 20 about the longitudinal axis 54 of stem piece 30, thus providing a firmly attached handlebar assembly (20) that allows for safe and responsive control of bike 10.

As shown in FIGS. 4, 5 & 7, handbrake levers 60 may be mounted to stem piece 30. Mounting brake levers 60 on stem piece 30 allows the closed loop, handlebar locking device 20 to be removed from stem piece 30 without interfering with the brake levers 60 or associated cabling (not shown). Brake levers 60 are preferable standard, off the shelf bicycle components. Other standard components and accessories, such as lights, bells, computers, to name a few, may also be mounted on, or otherwise attached to stem piece 30, so as not interfere with the attachment or removal, of handlebar locking device 20.

Figure 8:
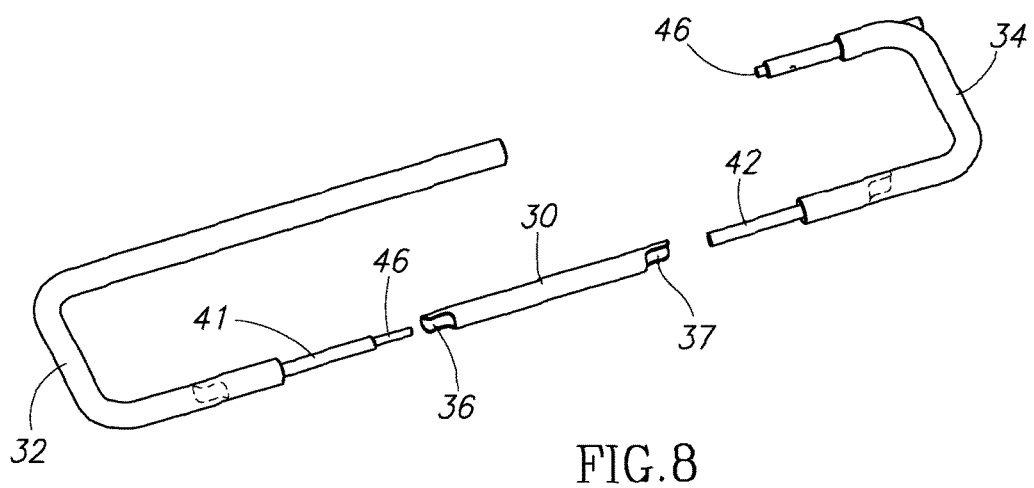
FIG. 8 is an explode schematic view illustrating elements of the locking device of FIG. 6.

FIG. 8 is an exploded view of handlebar locking device 20, showing various components of a preferred embodiment. Outer elements of device 20 include members 32, 34 and stem piece 30. Located inside members 32, 34, which are preferable hollow or tubular, are inner members 41, 42, which also may be hollow or tubular. According to an embodiment of the present invention, a security member 46 is located within inner members 41, 42. Security member 46 offers further theft protect by making it more difficult for a thief to defeat handlebar locking member 20. For example, security member 46 may be made of a solid, hardened steel bar and allowed to "float" inside inner members 41, 42, allowing it to move slightly relative to inner members 41, 42. This would further impede a thief's effort to saw through or otherwise defeat device 20.

Figure 9:
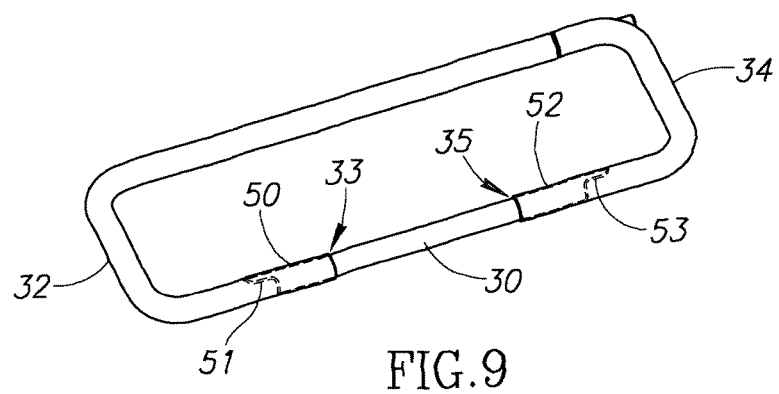
FIG. 9 illustrates the locking device in FIG. 8 in a closed loop configuration.
Figure 10:
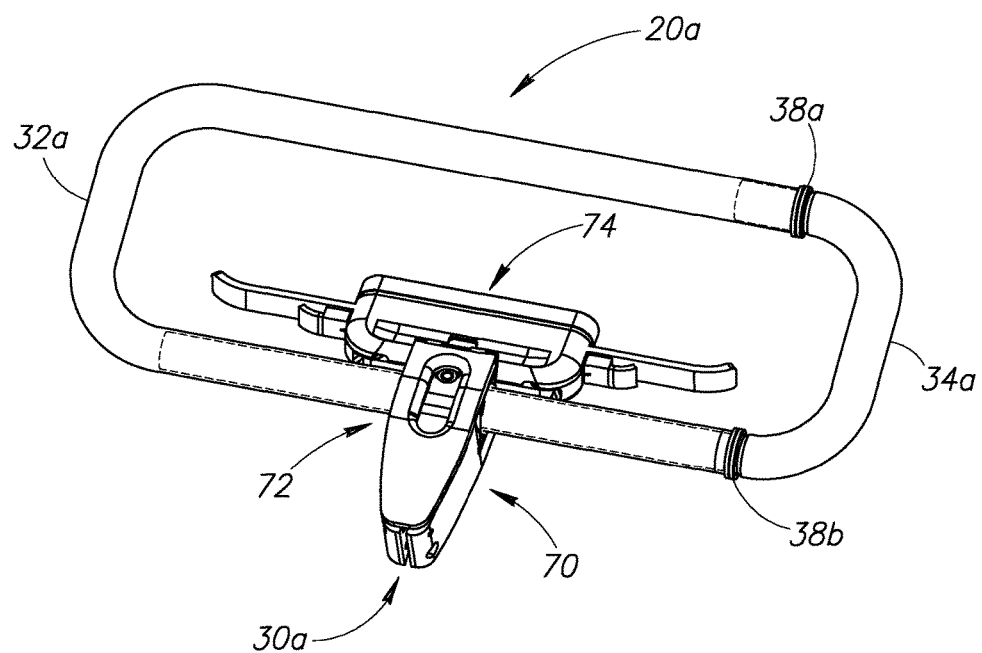
FIG. 10 illustrates an alternative embodiment of the present invention in a locked, closed loop configuration.
Figure 11:
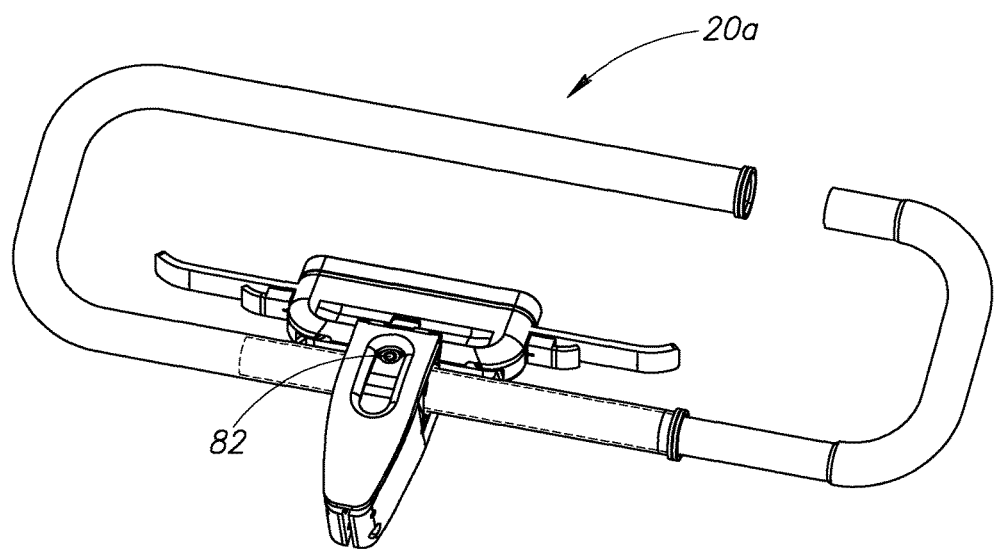
FIG. 11 illustrates an alternative embodiment of the present invention in an unlocked, open configuration.
Figure 12:
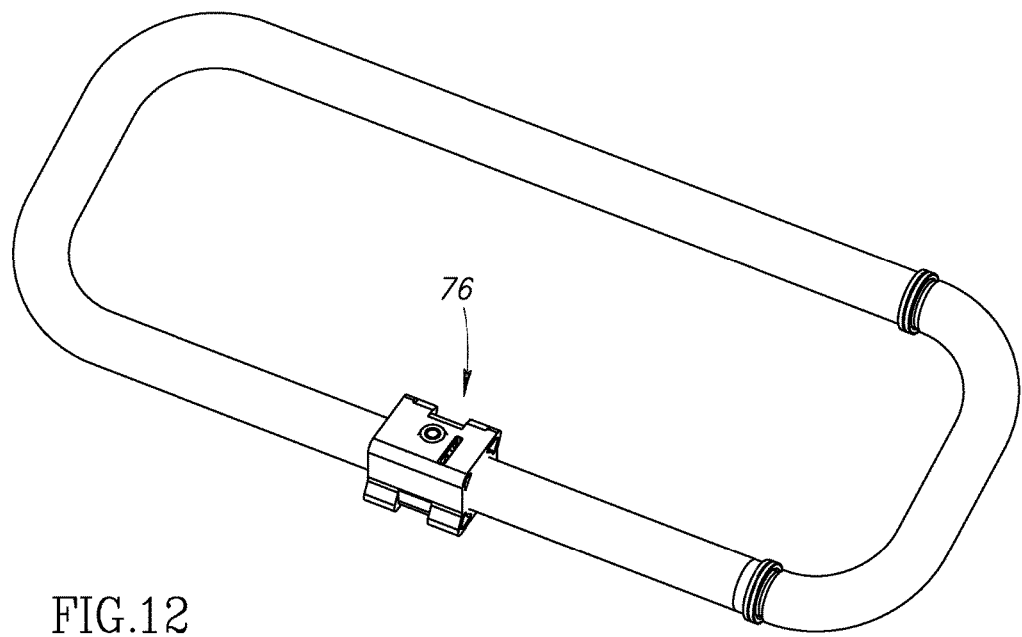
FIG. 12 illustrates aspects of the embodiment depicted in FIG. 10.
Figure 13:
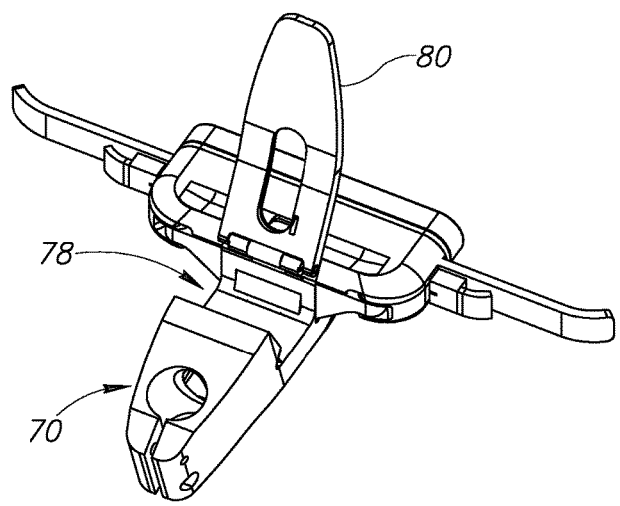
FIG. 13 illustrates further aspects of the embodiment depicted in FIG. 10.

For purposes of clarification, when in a closed loop (locked) orientation, handlebar locking device 20 is configured as illustrated in FIG. 9. As shown in the figure, stem piece 30 has an outside diameter less than the inside diameter of hollow members 32, 34 allowing it to slide into open ends 33, 35 of members 32, 34. As depicted in FIG. 3, device 20 has been removed from stem piece 30 in order to lock the wheels 14, 15 of bike 10. If a thief were able to defeat device 20, it would be destroyed and would not be suitable for remounting onto stem piece 30. Further, stem piece 30 it too small to adequately serve as a handlebar for bike 10, thereby making it difficult for the thief to ride away on the bike 10 even after defeating device 20.

An alternative embodiment of closed loop handlebar locking device 20a is depicted in FIGS. 10-13. For purposes of clarity, like elements of different embodiments have been given similar alphanumeric labels. Device 20*a* comprises members 32*a*, 34*a* and stem piece 30*a*. Members are connected at points 38*a*, 38*b* to form a closed loop. In accordance with this embodiment, stem piece 30*a* is an assembly comprising a mounting section 70 for attaching to stem 19, locking member 72 and a control module 74. Control module may contain components and accessories such as, for example, brakes, turn signals, lights and alarms, and may be operated manually or by electric, hydraulic, or pneumatic sources. Mounting lug 76 is attached to device 20 and is further attached to stem piece 30*a* by inserting lug 76 into receptacle 78. Closing lever 80 secures lug 76 in receptacle 78. The assembly may be further secured by locking the assembly at lock 82, with, for example a key (not shown). Device 20*a* may be used to operate bike 10 when mounted to stem 19 or to lock bike 10 while attached to, or removed from, stem 19, in the general manner described above.

Figure 14:
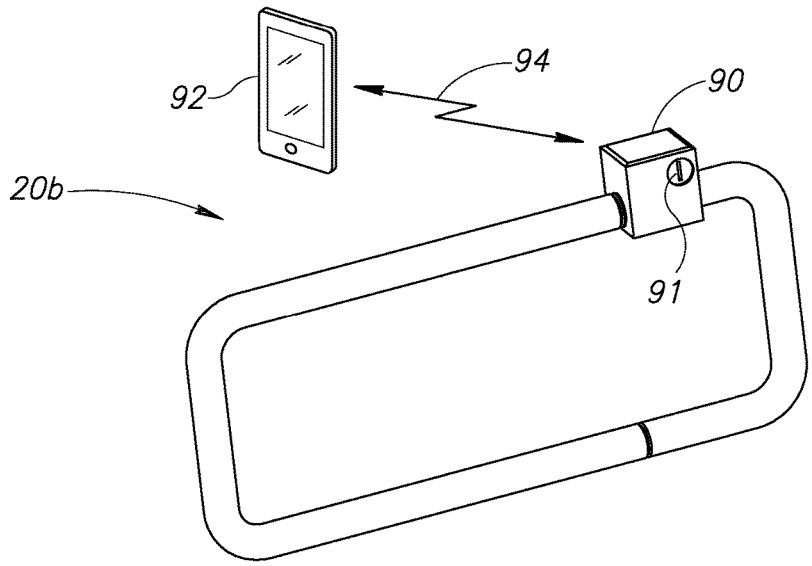
FIG. 14 illustrates yet another alternative embodiment of the present invention in a locked, closed loop configuration.
Figure 15:
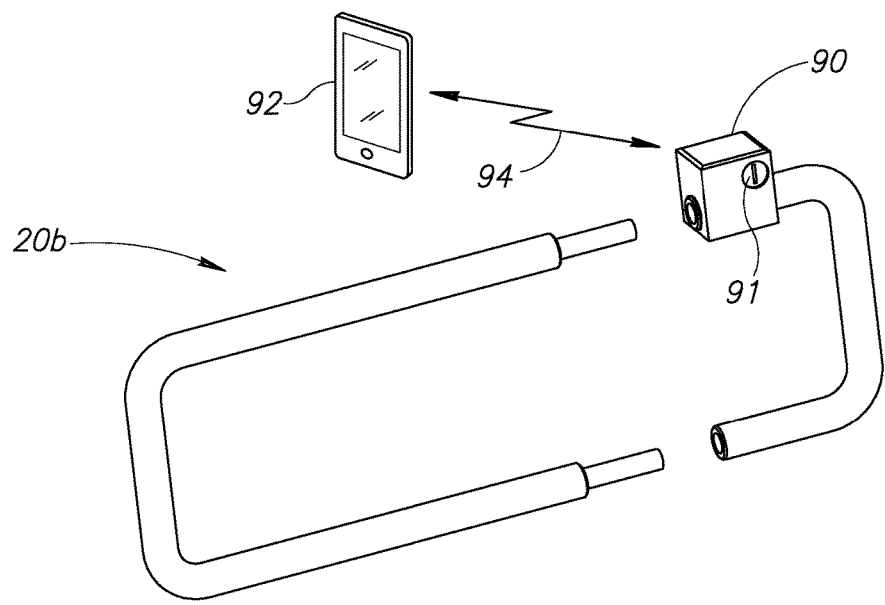
FIG. 15 illustrates the embodiment of the present invention depicted in FIG. 14 in an unlocked, open configuration; and, FIG. 16 illustrates a further alternative embodiment of the present invention having an ergonomic shape.

FIGS. 14 and 15 show yet another embodiment of device 20, in which lock 90 is in the form of an electronic lock, that may, for example, be locked (FIG. 14) or unlocked (FIG. 15) by an appropriate device 92. Device 92 may be, for example, a smartphone carried by the rider that uses Bluetooth® or other suitable wireless technology 94 to communicate with, and operate, lock 90. Lock 90 preferably includes a backup 91 that permits the rider to use a key or combination to manually operate lock 90.

Figure 16:
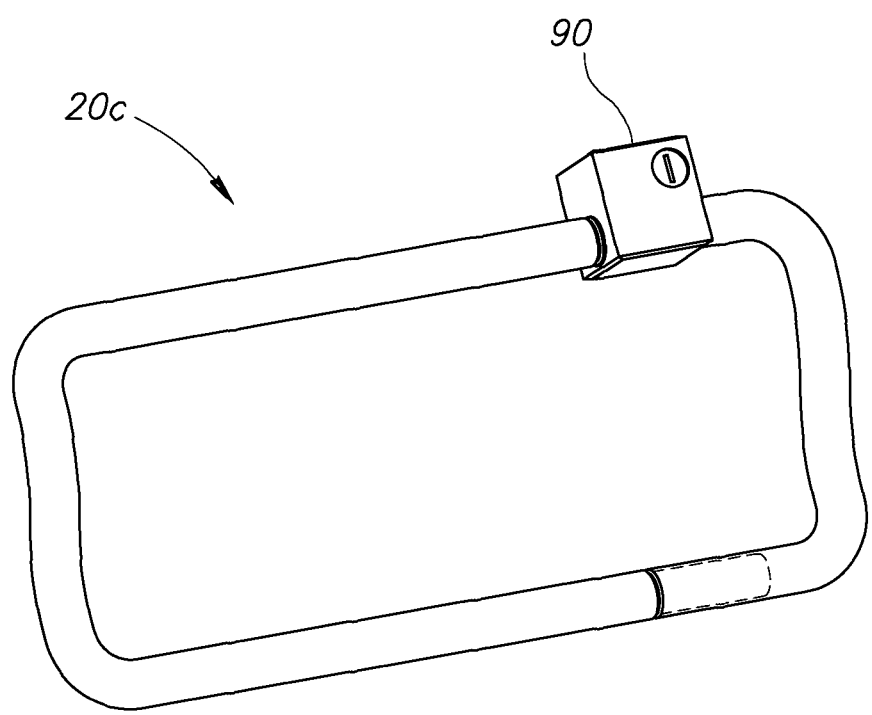

A further, alternative embodiment of closed loop, handlebar locking device 20 having an ergonomic shape is shown in FIG. 16. It is understood that the ergonomic, closed loop shape depicted is for illustrative purposes only and is merely an example of other possible shapes of device 20. Further, device 20 is shown with an electronic lock 90, but it is understood that lock 90 could, for example, be a key or combination type of lock.

While preferred and alternative embodiments of the invention has been illustrated and described, as noted above, many changes can be made without departing from the spirit and scope of the invention. For example, the closed loop handlebar locking device may be made from any material having sufficient integrity, such as steel, light weight alloys, or composites. The shape of the closed loop handlebar locking device may be any closed loop design that acts to secure the bike when in a locking configuration and which allows for operation of the bike when in a handlebar configuration. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A device for locking a bicycle comprising:
   a tubular stem piece have a first interlocking end and a second interlocking end, wherein the stem piece is configured to releasably couple to a stem of the bicycle;
   a first tubular handlebar member having a first end and a second end, wherein the first end is configured to detachably receive the first interlocking end of the stem piece;
   a second tubular handlebar member having a first end and a second end, wherein the first end is configured to detachably receive the second interlocking end of the stem piece and the second end of the second tubular handlebar member is detachably coupled to the second end of the first tubular handlebar member so as to form a closed loop planar handlebar; and
   wherein the closed loop planar handlebar is attached to the bicycle to enable steering of the bicycle; and
   wherein the first end of the first tubular handlebar member is configured to detachably receive the first end of the second tubular handlebar member when not coupled to the bicycle to lock the bicycle to a fixed object or to lock at least one wheel of the bicycle to the bicycle to prevent substantial rotational movement of the at least one wheel.

2. The device of claim 1, wherein the closed planar loop handlebar is also configured to lock the bicycle to the fixed object when the closed loop planar handlebar is attached to the bicycle.

3. The device of claim 1, further comprising a lock for locking the first tubular handlebar member to the second tubular handlebar member.

4. The device of claim 3, wherein the lock is integrated with the first and second tubular handlebar members.

5. The device of claim 4, wherein the lock is in direct communication with the second end of the first tubular handlebar member and the second end of the second tubular handlebar member.

6. The device of claim 3, wherein the lock comprises one of a key lock, a combination lock, or a remote control lock.

7. The device of claim 1, further comprising:
   a security member located within at least a portion of each of the tubular stem piece and the first and second tubular handlebar members.

8. The device of claim 7, wherein the security member is cylindrical and has an outside diameter that is less than an inside diameter of the stem piece and an inside diameter of the first and second tubular handlebar members and is moveably positioned within the stem piece and first and second tubular handlebar members.

9. The device of claim 8, wherein the security member comprises hardened steel.

10. The device of claim 1, wherein the first tubular handlebar member and the second tubular handlebar member are hollow.

11. The device of claim 10, wherein the first tubular handlebar member comprises a first inner member, and the second tubular handlebar member comprises a second inner member, and wherein the first inner member is in contact with the second inner member when wherein the closed loop planar handlebar is attached to the bicycle to enable steering of the bicycle.

12. The device of claim 11, wherein the first inner member and the second inner member are hollow.

13. The device of claim 1, wherein the first interlocking end and the second interlocking end of the tubular stem piece comprise locking lugs.

14. The device of claim 13, wherein the first end of the first tubular handlebar member and the first end of the second tubular handlebar member comprise mating receivers, wherein the mating receivers are configured to prevent rotation of the first tubular handlebar member and the second tubular handlebar member when in contact with the locking lugs of the first and second interlocking ends of the tubular stem piece.

15. The device of claim 1, wherein the tubular stem piece comprises mounts for at least one brake lever.

\* \* \* \* \*